Figures 9, 10:
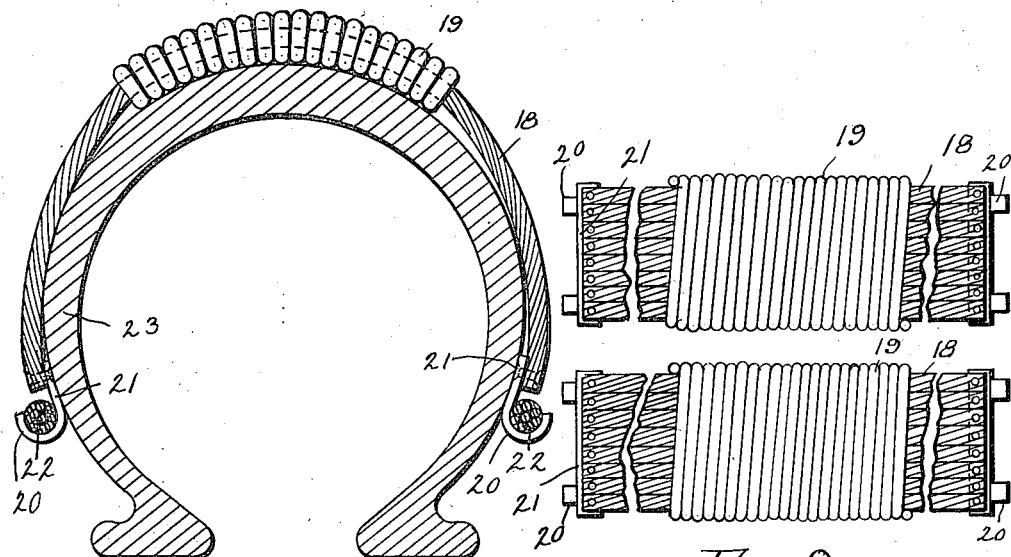

L. R. POSCHADEL.
PNEUMATIC TIRE.
APPLICATION FILED FEB. 23, 1916.
1,401,814.
Patented Dec. 27, 1921.
3 SHEETS—SHEET 1.
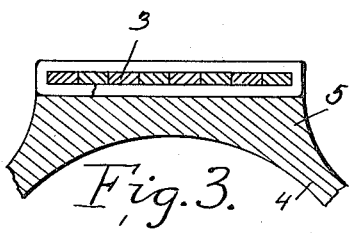
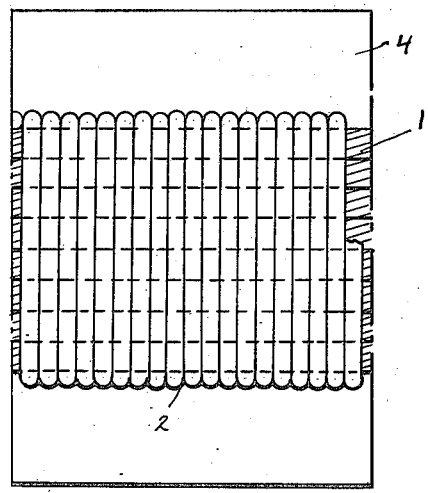
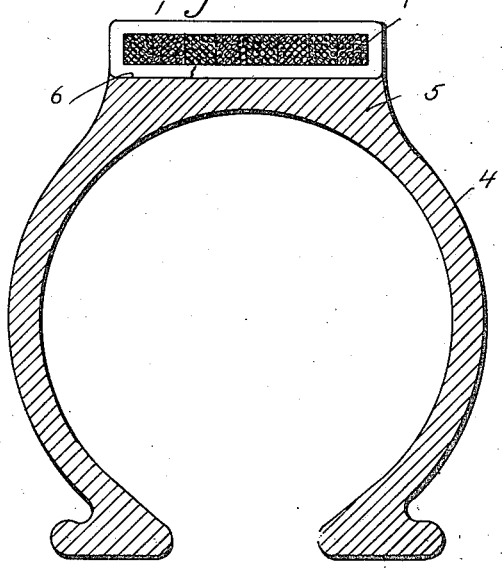
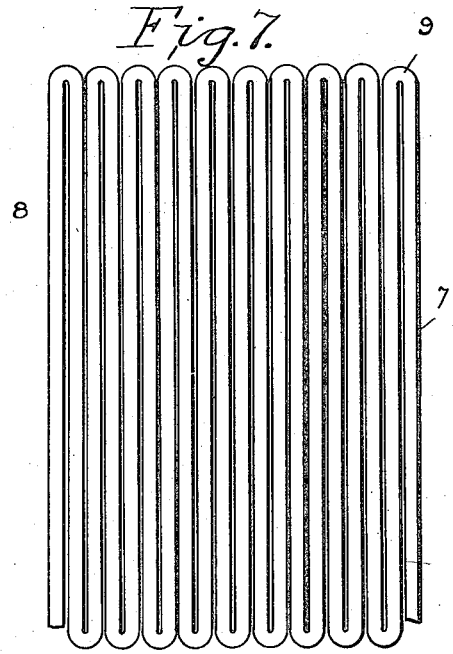
Inventor
L. R. Poschadel
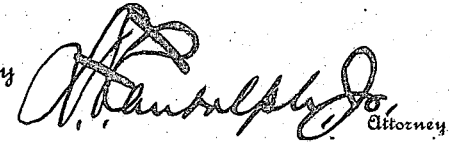

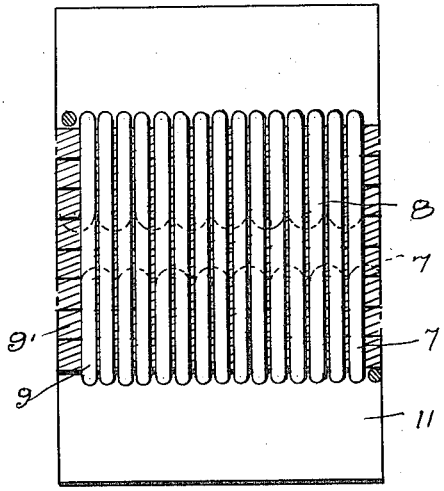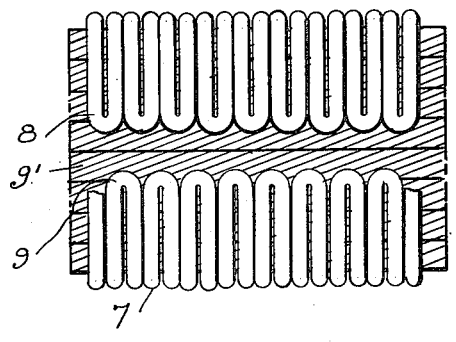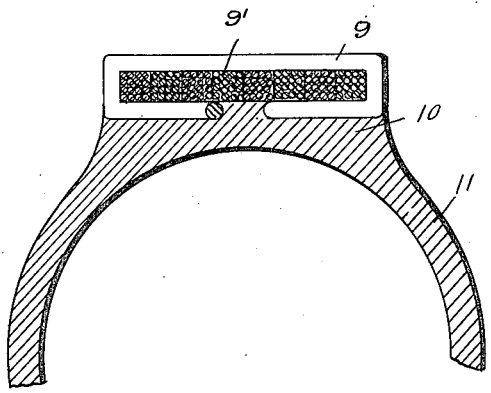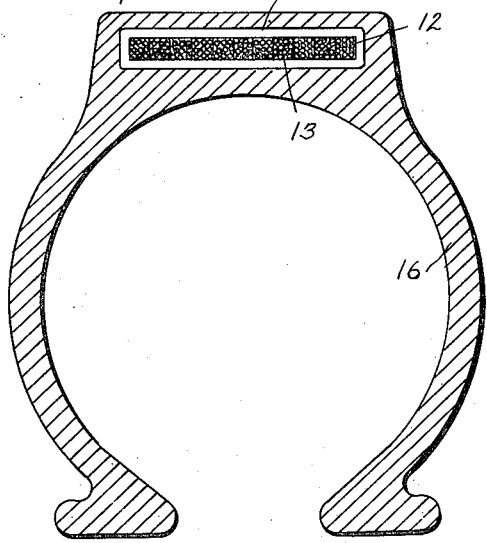

L. R. POSCHADEL.
PNEUMATIC TIRE.
APPLICATION FILED FEB. 23, 1916.

1,401,814.

Patented Dec. 27, 1921.

3 SHEETS—SHEET 3.

Inventor
L. R. Poschadel

Witnesses

By
Attorney

UNITED STATES PATENT OFFICE.

LEONARD R. POSCHADEL, OF MILWAUKEE, WISCONSIN.

PNEUMATIC TIRE.

1,401,814.　　　　　　Specification of Letters Patent.　　Patented Dec. 27, 1921.

Application filed February 23, 1916. Serial No. 80,054.

*To all whom it may concern:*

Be it known that I, LEONARD R. POSCHADEL, a citizen of the United States, residing at Milwaukee, in the county of Milwaukee and State of Wisconsin, have invented certain new and useful Improvements in Pneumatic Tires; and I do hereby declare the following to be a full, clear, and exact description of the invention, such as will enable others skilled in the art to which it appertains to make and use the same.

The invention relates to improvements in pneumatic tires.

The object of the present invention is to improve the construction of pneumatic tires and to equip the same with a simple, practical and comparatively inexpensive reinforcing section or sections of strong and durable construction adapted to protect an inner tube from puncture and capable of increasing the durability and wearing qualities of an outer tube or shoe.

A further object of the invention is to provide a metallic reinforcing section of this character having sufficient resiliency to enable a pneumatic tire or a solid tire to yield and afford the desired cushioning action and provided also with a highly tempered relatively hard wearing surface which will not interfere with the yieldable character of the protecting sections.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figures 11, 12:
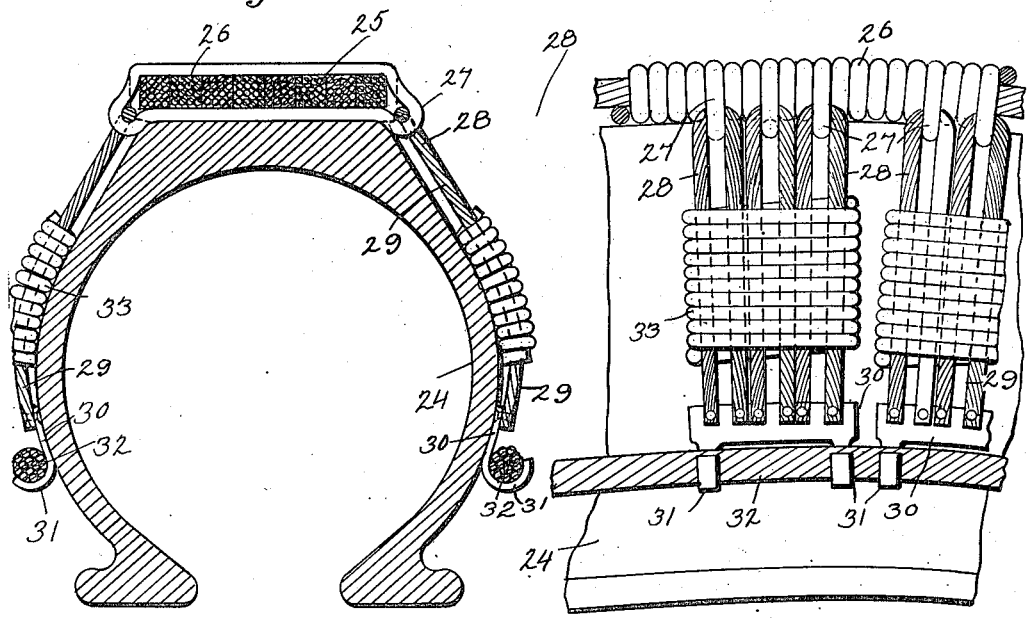

Figure 1 is a top plan view of a portion of a pneumatic tire constructed in accordance with this invention, Fig. 2 is a transverse sectional view of the same, Fig. 3 is a similar view showing the reinforcing section made up of a plurality of single wire strands, Fig. 4 is a top plan view of a portion of a pneumatic tire showing another form of the invention, Fig. 5 is a bottom plan view of the portion of the reinforcing section shown in Fig. 4, Fig. 6 is a transverse sectional view of the tire shown in Fig. 4, Fig. 7 is a plan view of a portion of the sheet showing the same before bending or folding the transversely disposed portions of the wire around the longitudinal strands, Fig. 8 is a transverse sectional view of a pneumatic tire in which the reinforcing or protecting section is embedded in the tread portion of the outer tube or shoe, Fig. 9 is a plan view of a portion of a tire showing another form of the invention in which the protecting means consist of transversely disposed reinforcing sections, Fig. 10 is a transverse sectional view of the same, Fig. 11 is a side elevation of a portion of a tire provided with side guards or protecting devices, Fig. 12 is a transverse sectional view of the same.

Like numerals of reference designate corresponding parts in the several figures of the drawings.

In the accompanying drawings in which are illustrated the preferred embodiments of the invention, the protecting section illustrated in Figs. 1 and 2 of the drawings comprises in its construction a single row of annular circumferentially arranged strands 1 preferably consisting of flat cables of spirally twisted wires and arranged within a transversely disposed spirally coiled wire 2 of materially greater temper and hardness than the wires of the longitudinal or circumferentially arranged strands. The circumferentially arranged strands are sufficiently long and the metal which may be steel, brass or any other suitable material is adapted to yield to permit the necessary cushioning action of the pneumatic tire and the outer transversely disposed highly tempered wire 2 which forms a tread or wearing surface may owing to the transverse disposition of the coils or convolutions be made of the desired degree of hardness without interfering with the yieldable character of the longitudinally disposed strands. In this way the reinforcing and protecting section which is shown as a tread section in Figs. 1 and 2 may be constructed with the desired wearing qualities to withstand hard usage on rough roads. Instead of employing strands made up of a plurality of coiled or twisted wires in cable form, the circumferentially arranged longitudinally disposed strands may consist of single flat wires 3 as illustrated in Fig. 3 of the drawings but the strands may be of any desired configuration and one or more wires may be employed in the construction thereof as will be readily understood.

The circumferentially arranged tread section is shown applied to an outer tube or shoe 4 of the clencher type preferably provided with a thickened tread portion 5 having a recess 6 extending circumferentially around the thickened tread portion of the outer tube or shoe and forming a seat for the tread section. The reinforcing or protecting tread section may of course be applied to various other forms of outer tubes or shoes and it may be advantageously used in connection with solid rubber tires where it is desired to equip the same with a wearing or tread surface of great durability. The transversely disposed outer highly tempered wire will last for a great length of time and should it become worn it can be cheaply replaced without necessitating the renewal of the circumferentially arranged longitudinal strands. The circumferentially arranged longitudinal strands may be of any other desired shape cross sectionally and in the construction of the circumferentially arranged strands, the wires may be conveniently twisted or woven into cable form and the cables afterward passed between shaping rollers or other elements to flatten the strands into substantially rectangular form in cross section.

In Figs. 4 to 7 inclusive of the drawings, is illustrated another form of the invention in which the transversely disposed highly tempered wearing wire 7 is first wound or coiled back and forth to form a sheet 8 as illustrated in Fig. 7. This sheet or strip 8 which is made of the desired length and width to suit the reinforcing or protecting section to which it is applied, may be cheaply manufactured, and the loops 9 formed by bending the wires 7 back and forth, are bent or folded under the row or layer of strands 9, which are embraced by the said outer wire 7. The outer highly tempered wire 7 may be of any desired cross sectional shape. The reinforcing circumferentially arranged tread section shown in Figs. 4 to 7 inclusive is arranged on a thickened tread portion 10 of an outer tube or shoe 11 similar to the outer tube or shoe illustrated in Figs. 1 and 2 of the drawings. The inwardly bent transversely disposed loops 9 preferably terminate short of the center of the row or layer of circumferentially arranged strands but they may be of any desired length.

In Fig. 8 of the drawings is illustrated another form of the invention in which a circumferentially arranged reinforcing and protecting section 12 composed of circumferentially arranged strands 13 and a transversely disposed spirally coiled wire 14, is embedded in the thickened tread portion 15 of an outer tube or shoe 16.

The reinforcing or protecting section 12 which is adapted to prevent puncture of an inner tube, is shown straight but it may be of any other configuration and will be of a width to suit the diameter of the tire. The thickened tread portion is provided with a flat face 17 but this may of course be varied to provide the desired form of outer tube or shoe.

In Figs. 9 and 10 of the drawings is illustrated a form of the invention in which the protecting means consist of transversely disposed sections arranged side by side and consisting of one or more rows or layers of strands 18 and a spirally coiled highly tempered relatively hard wire 19 which extends transversely of the strands and preferably terminates short of the ends thereof, the spirally coiled highly tempered wire being preferably of a length to protect the tread portion of the tire as illustrated in Figs. 9 and 10 but the highly tempered spirally coiled wire may extend any distance along the transversely disposed reinforcing and protecting section.

The transversely disposed protecting sections are provided at their ends with suitable hooks 20 preferably arranged in pairs and extending from an attaching plate 21 which is suitably secured to the strands 18 at the ends thereof and forms a means for connecting the strands at the ends of the sections. The hooks 20 engage annular side cables or members 22 located at opposite sides of the tire and adapted to retain the sections in place on the outer tube or shoe.

The annular side cables or members which extend around the tire may consist of one or more wires as will be readily understood. The transversely disposed reinforcing sections which are curved lengthwise of the sections are preferably applied to an outer tube or shoe 23 of circular form in cross section but the outer tube or shoe may be of any preferred form and the transversely disposed protecting and reinforcing sections may also be applied to solid tires.

In Figs. 11 and 12 of the drawings is illustrated a form of the invention embodying a circumferentially arranged tread section and transversely disposed side sections or guards for protecting the side portions of the outer tube or shoe 24 of a pneumatic tire. The circumferentially arranged tread section is composed of a layer or row of circumferential strands 25 and a transversely disposed spirally wound highly tempered relatively hard wire 26, the coils or convolutions of which are provided at intervals with extensions 27 to link into loops 28 formed by the longitudinal strands of the side sections or guards. The side sections or guards preferably consist of a plurality of strands 29 formed by doubling a piece of wire or cable of the proper length to form a pair of strands and a connecting loop 28 to link into the extension 27 of the spirally coiled wire of the tread section.

The lower ends of the strands are secured to a connecting or attaching plate 30 provided with spaced hooks 31 which engage circumferentially disposed annular cables or members 32 located at opposite sides of the tire similar to the side cables or members shown in Fig. 9. The side sections or shields are preferably spirally wound with a highly tempered relatively hard wire 33 but it may of course be omitted and instead of employing a wire in the construction of the side sections or shields any other suitable material may be used, such as leather, raw hide, canvas, belting or similar material, either plain or reinforced.

By reason of the fact that the outer wires are highly tempered, they are possessed of a high degree of elasticity thereby normally retaining the tread section in its proper place and adding appreciably to the resiliency of the tire.

What is claimed is:—

1. A tread member for pneumatic tires comprising a core consisting of a plurality of flexible metal strands arranged in parallel abutting relation, and a casing for the core consisting of a wire having a high degree of elasticity and coiled transversely about the core with its convolutions in contact with each other and with the core.

2. A tread member for pneumatic tires comprising a core consisting of a plurality of metal strands of relatively low elasticity arranged in parallel abutting relation, and a casing for the core consisting of a wire of relatively high elasticity coiled transversely about the core with its convolutions in contact with each other and with the core.

3. A tread member for pneumatic tires comprising a core consisting of a plurality of strands arranged in parallel abutting relation and each consisting of spirally twisted wires of relatively low elasticity, and a casing for the core consisting of a wire of relatively high elasticity coiled transversely about the core with its convolutions in contact with each other and with the core.

4. A tread member for pneumatic tires comprising a core having flat inner and outer sides and consisting of a plurality of flexible metal strands arranged in parallel abutting relation, and a casing for the core having flat inner and outer sides and consisting of a wire of high elasticity coiled transversely about the core with its convolutions in contact with each other and with the core, certain of the convolutions of the casing being formed to provide loops at the lateral sides of the tread member, and attaching means engaging with said loops.

5. A tread member for pneumatic tires comprising a core having flat inner and outer sides and consisting of a plurality of flexible metal strands arranged in parallel abutting relation, each strand consisting of spirally twisted wires, and a casing having flat inner and outer sides and consisting of a wire of high elasticity coiled transversely about the core with its convolutions in contact with each other and with the core, certain of the convolutions of the core being formed to provide loops at the lateral sides of the tread member, and tread attaching means engaging said loop.

In testimony whereof I affix my signature in presence of two witnesses.

LEONARD R. POSCHADEL.

Witnesses:
 ELSIE I. ALBRECHT,
 CLARA A. POSCHADEL.